Aug. 10, 1926. 1,595,372
J. A. H. BARKEIJ
INTERNAL COMBUSTION ENGINE
Filed April 9, 1923  5 Sheets-Sheet 4

INVENTOR
JEAN A. H. BARKEIJ
BY Arthur P. Slee
ATTY.

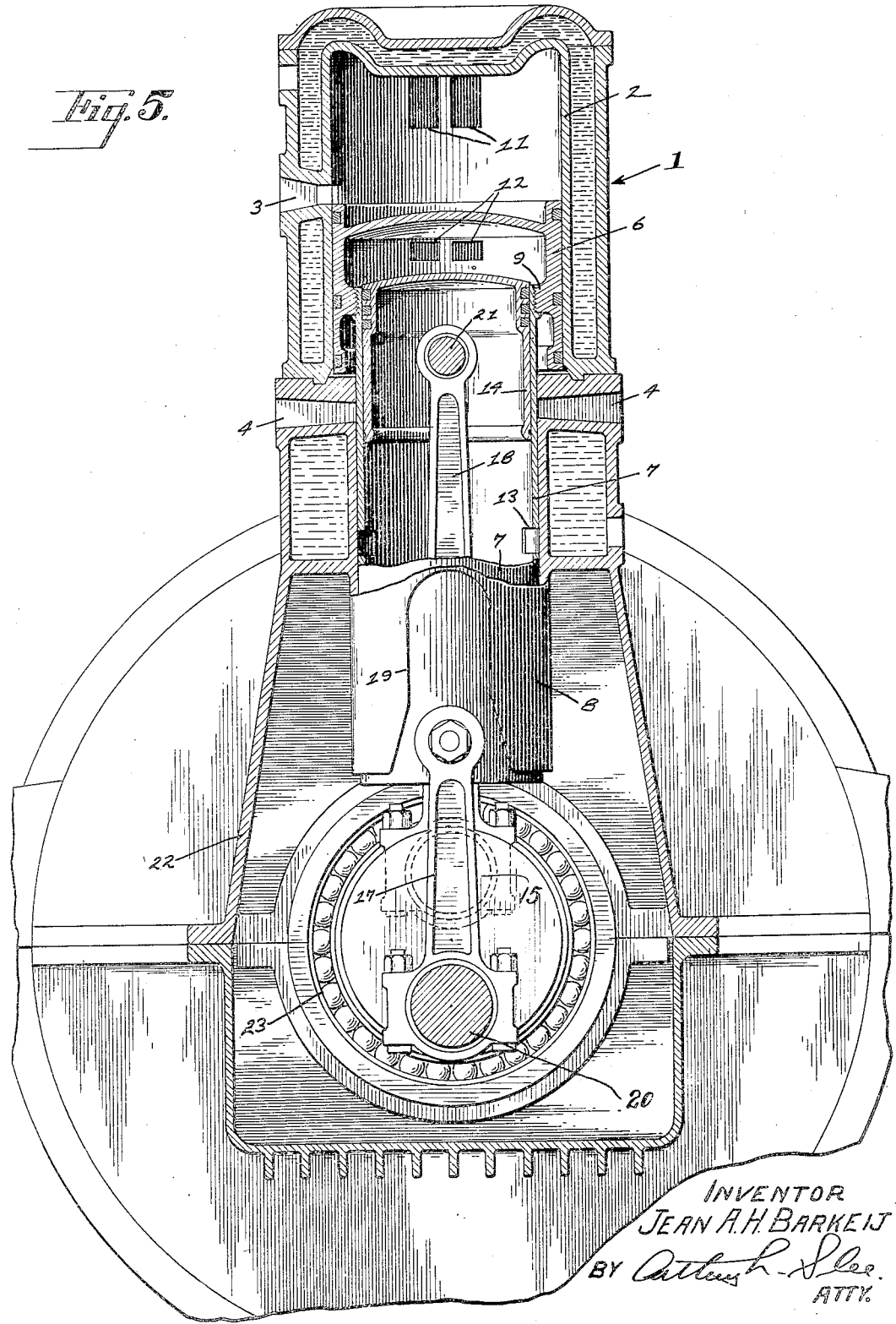

Patented Aug. 10, 1926.

1,595,372

UNITED STATES PATENT OFFICE.

JEAN A. H. BARKEIJ, OF LOS ANGELES, CALIFORNIA.

INTERNAL-COMBUSTION ENGINE.

Application filed April 9, 1923. Serial No. 631,022.

My invention relates to improvements in internal combustion engines of the two cycle type, adapted for the introduction and ignition of a combustible mixture between a pair of oppositely reciprocating pistons, direct connected to the same crank shaft.

The primary object of my invention is to provide an improved two-cycle engine, with a view to obtaining increased power and efficiency and to reduce vibration and thereby obtain greater smoothness in operation.

Another object is to provide an improved engine of light and compact construction capable of delivering a relatively great amount of power.

A further object is to provide an engine wherein the number of moving parts is reduced to a minimum and valve and timing mechanism is entirely eliminated.

I accomplish these and other objects hereinafter appearing by the means disclosed in the drawings in which- Fig. 1 is a broken side elevation shown partly in section of my improved internal combustion engine.

Fig. 5 is a similar view showing the position of the pistons at the beginning of the firing or power stroke.

Figure 1:
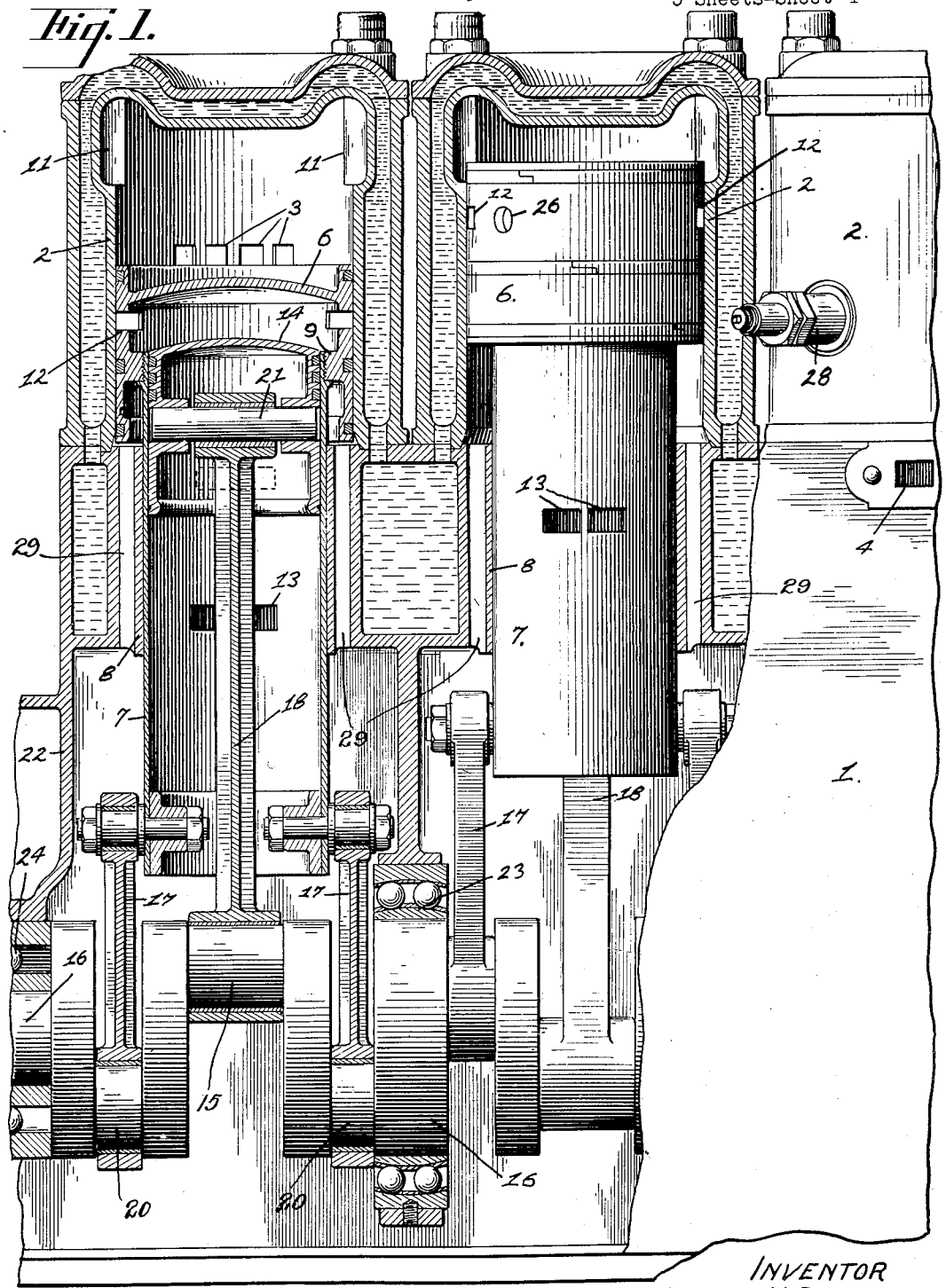

Referring to the drawings the numeral 1 is used to designate in general an internal combustion engine provided with a plurality of cylinders 2 each having an intake port 3 and exhaust ports 4 formed therein.

Within each cylinder 2 is mounted a main piston 6 adapted for reciprocatory movement therein. Each piston 6 is provided with a smaller diameter tubular trunk 7 extending downwardly from the piston head and engaged by a guide 8. In my preferred construction illustrated in the drawings the piston 6 consists of an upper body portion provided with an inwardly extending annular rib 9 threaded to receive the end of a sleeve forming the tubular trunk 7.

The upper portions of the cylinders 2 are shaped to form compression chambers above the pistons 6, recesses 11 being formed in the sides of the cylinder adjacent the top adapted to establish communication between the compression chamber and ports 12 opening into the upper interior portions of the pistons 6 when the pistons are at the upper ends of their strokes. Exhaust ports 13 are formed in the sides of trunks 7 and arranged to register with the exhaust ports 4 of the cylinder when the pistons 6 are at the lower ends of their strokes.

An inner piston 14 is mounted for reciprocating movement within the trunks 7 of each piston 6.

The main pistons 6 and the inner pistons 14 are connected to a common crank shaft 16 by means of suitable connecting rods 17 and 18 respectively, each main piston and its inner piston being connected to cranks 180° apart. In my preferred construction a connecting rod 17 is connected upon each side of trunks 7, recesses 19 being formed upon the adjacent portions of the guides 8 to accommodate the ends of the connecting rods 17 on their up-strokes. A single centrally disposed connecting rod 18 engages a wrist pin 21 carried by each piston 14 in any suitable manner.

The crank shaft 16 may be of any suitable construction and mounted in suitable bearings as at 22 and 24 below the cylinders 2 within a crank case 22. The cylinders and the upper portion of the crank case are preferably made of a double walled construction to provide a suitable waterjacket for cooling the engine when in operation. The intakes 3 and the exhaust ports 4 of the several cylinders are arranged to receive manifolds, not shown, of any suitable character for conducting a combustible mixture to the several cylinders of the engine and for exhausting the burnt gases.

Figure 3:
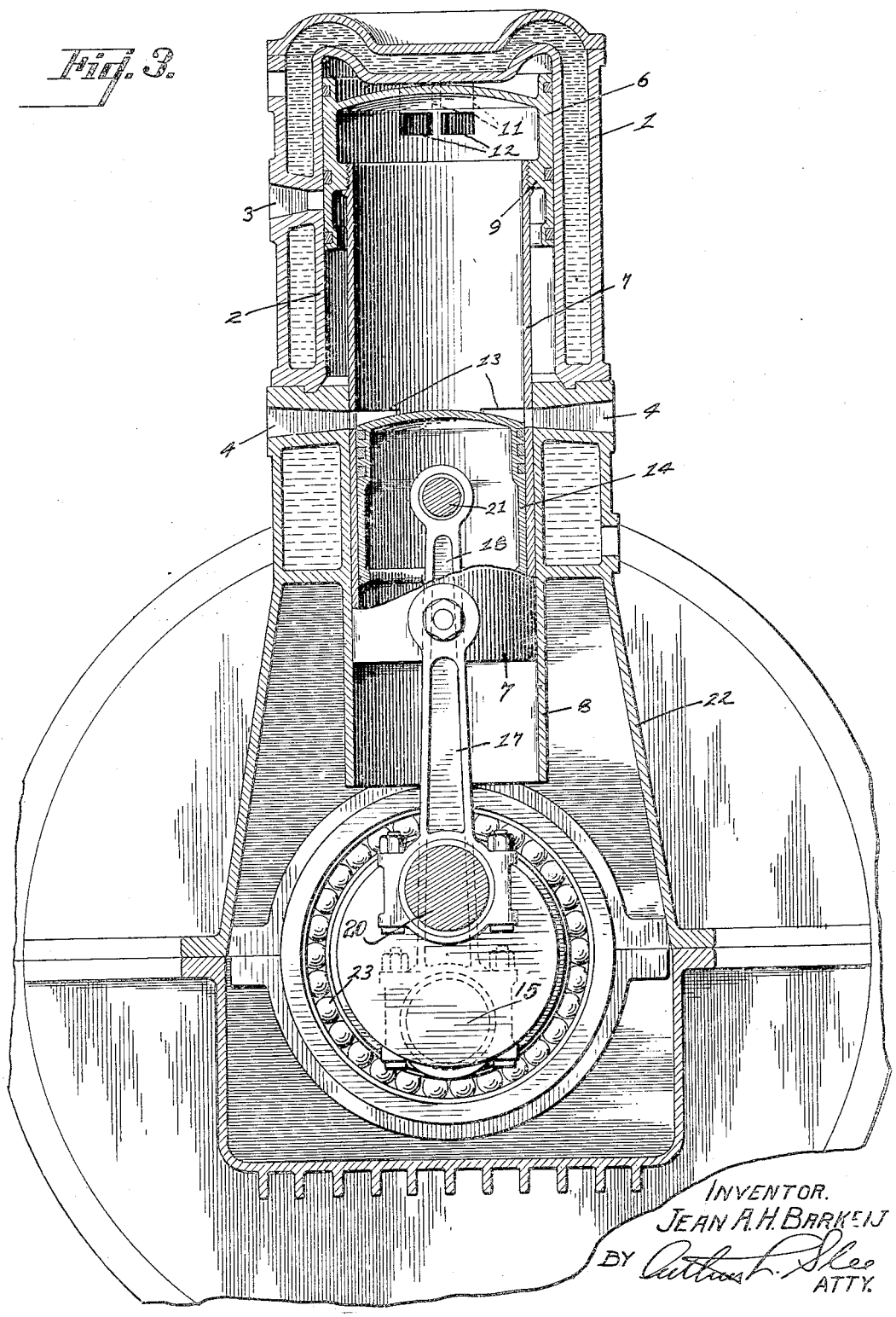
Fig. 3 is a vertical transverse section showing one cylinder and the pistons mounted therein, said pistons being shown in the relation existing at the end of the power stroke.

The operation of my improved engine is as follows. Considering only a single cylinder, and assuming the pistons to be positioned as at the beginning of the suction stroke of the main piston 6 or as it will hereafter be termed, its charging stroke, as shown, in Fig. 3 of the drawings, it will be noted that the ports 13 register with the exhaust ports 4 of the cylinder. Intake ports 12 of the piston are opposite the lower portions of the passages 11 of the cylinder so that the spent gases from the preceding power stroke may be exhausted from the piston and the cylinder, and at the same time a fresh charge of a combustible mixture may be admitted from the upper portion of the cylinder into the interior of the cylinder in a manner hereinafter more fully explained. It will also be noted that the inner piston 14 is now positioned at its extreme inner position so as to clear the exhaust ports 13 of trunk 7.

Figure 4:
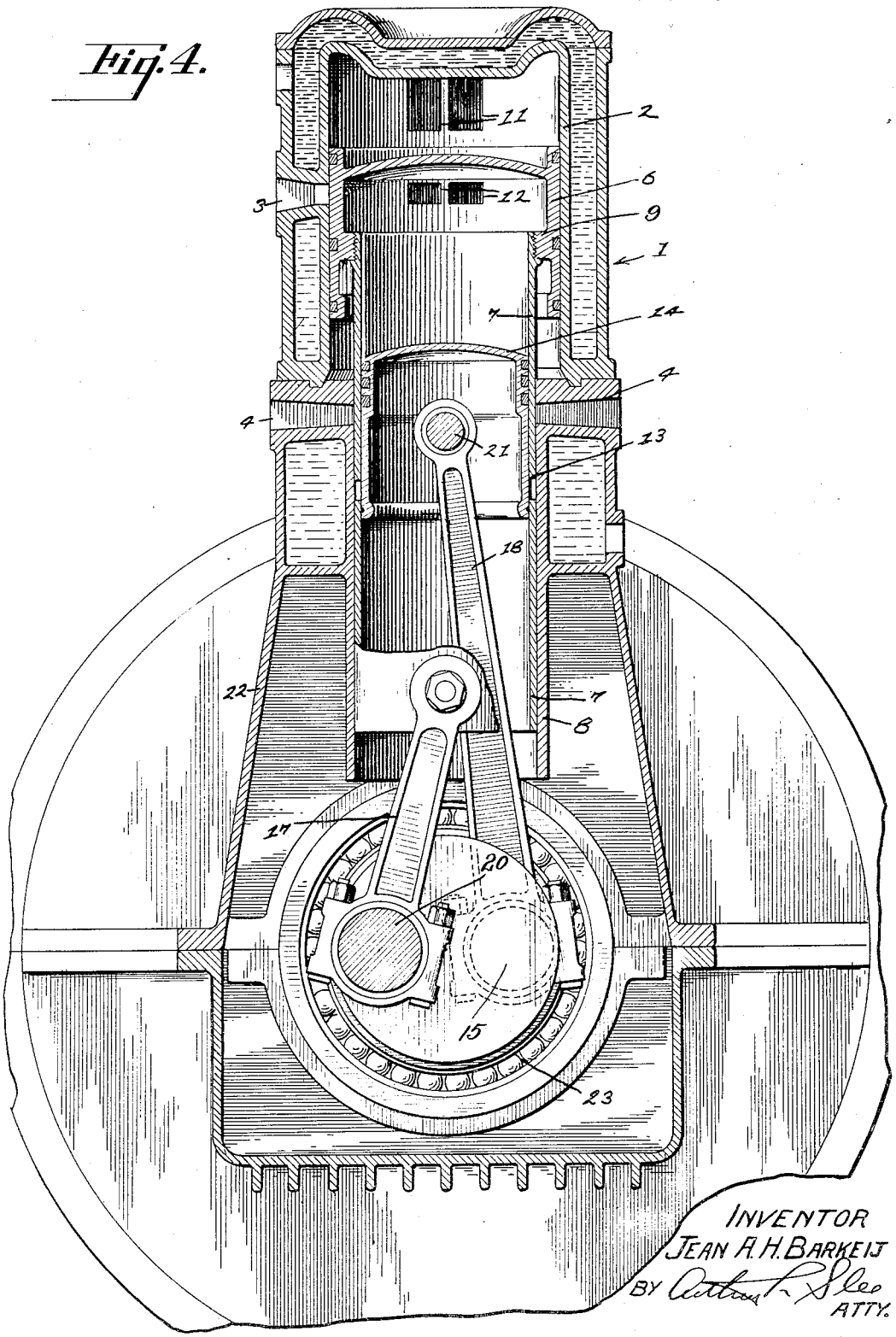
Fig. 4 is a similar vertical section showing the pistons in their mid position.

As the cranks 15 and 20 move past dead center the pistons 6 and 14 will be moved in opposite directions, the first slight movement closing ports 13 and thereby preventing the escape of gas from within the trunk. As the pistons are moved further the space between the inner piston 14 and the inner surface of the head of the piston 6 will be diminished and the charge of combustible mixture admitted thereinto through the intakes 12 will therefore be steadily compressed as the pistons are moved through the intermediate position shown in Fig. 4 to the opposite extreme positions shown in Fig. 5 of the drawings.

As the pistons reach the extreme positions at the end of this compression stroke as shown in Fig. 5 an aperture 26 formed in the side of the body of the piston 6 is caused to register with an opening 27 formed in the wall of the cylinder, said opening having a suitable spark plug 28 adapted to ignite the charge compressed between the pistons. The force resulting from the ignition and expansion of the charge forces the pistons apart, power being directed to the crank shaft by the connecting rods of both pistons.

While the pistons are being moved as above described to compress the charge within the main piston, the movement of the latter creates a partial vacuum within the upper portion of the cylinder 2 thereby causing a fresh charge of combustible mixture to be drawn into the cylinder through ports 3 when the upper edge of the piston 6 clears the intake port as shown in Fig. 5. During the succeeding return, or firing stroke of the main piston this fresh charge will be compressed within the upper portion of the upper portion of the cylinder.

As the pistons reach the end of the expansion stroke the exhaust ports 13 are again moved into registering relation with the ports 4 of the cylinder and the inner piston moved to uncover said ports 13 so that the burnt gases are permitted to escape from the piston and from the cylinder. At the same time the intake ports 12 are moved opposite the lower portions of the passages 11 thereby permitting the charge of combustible gas compressed above the main piston during the firing stroke to pass from above the piston through the passages 11 and into the interior of the piston. The inrush of the compressed charge within the upper portion of the piston displaces the spent gases from the previous charge so that substantially all the gases from the previous charge will be exhausted from between the pistons and a fresh charge will take the place thereof. The fresh charge is compressed and ignited as above described during the succeeding cycle.

It will be seen from the above that pistons 6 are utilized during their downward strokes to compress a charge below them while creating a vacuum above for drawing in a succeeding charge. During the following upward power strokes power is delivered to the crank shaft while compressing a fresh charge above the pistons. The interior pistons 14 cooperate with pistons 6 for compressing the explosive mixture, and also deliver power to the crank shaft.

It is possible to use the passages 29, which connect the crankcase with the annular space below the broader part of the upper piston, as oil ducts to convey liquid oil from the crankcase to said annular space by the suction created by the upper piston, in order to cool that part of the upper piston, which is not in constant contact with the water cooled cylinder wall. Considering the peculiar, uneven form of the upper piston, it is evident, that efficient, uniform cooling of the entire upper piston will be absolutely necessary for a satisfactory function of the engine. It is very probable that suction of oil vapor in said annular space will be entirely insufficient, especially since this engine is of the two-stroke type. Pipe lines from an oil pump to said annular spaces are not shown, but only the oil ducts 29, which lead directly back from said annular space to the crankcase. The suction of the vacuum created by the upper piston would be probably sufficient to suck oil through the passages 29 for cooling purposes, and the same oil could be pressed back through the same passages. An oil duct between said annular space and the crankcase is anyway necessary to lead oil to or from the piston, from or to the crankcase. It is further to be noted that, the inlet ports 3 in the cylinder wall 2, and the passage ports 12 in the upper piston 6, are so situated with respect to each other, that the ports 12 in said piston will pass the said inlet ports, while the piston has about its maximum speed. While the ports 12 pass the level of the ports 3, there are no piston rings between those two sets of ports, so that it is important that these ports pass each other during a short period in order to prevent any eventual loss of explosive gases during the compression or power stroke. The rim of the upper piston 6 is for this reason extended upwards purposely. The piston rings in the upper piston 6 could have been shown better and nearer to the inlet ports 12. The transfer passages 11, and corresponding transfer ports 12 in the piston 6, are also purposely placed diametrically opposite each other. The speed of the inrushing fresh gases is diminished on account of their speed in opposite direction and the loss through the exhaust ports 13 will be considerably diminished.

The quadrature relation of said transfer ports 12 and exhaust ports 13 will not be of much importance in this respect compared with the result of the diametrically opposed ports mentioned above. The quadrature relation is simply a very convenient matter of design, since it is desirable to have the exhaust ports on the outside for the connection of the exhaust pipe; the transfer ports 12 and inlet ports 2 have to be in a quadrature relation, while the inlet ports 3 have to be again on the outside for the inlet manifold. The quadrature relation of the ports 12 and 3 and the quadrature relation of the exhaust ports 13 and the transfer ports 12 are correlated and have to be such that both the inlet and exhaust ports have to be on the outside. The spark plug hole 26 has to be so situated that the construction does not interfere with the double quadrature relation of ports and slots. The spark plug hole could not have been placed in front of the inlet ports 12, since the spark plugs have to be placed again on the outside, as the exhaust and inlet manifolds. The construction, shown in the drawings, shows that the combination of these conditions can be executed without cramming one of the parts necessary for a two cycle engine. Any other arrangement would give some trouble and would be unmechanical.

The ignition of the charge compressed between the two oppositely reciprocating pistons causes all the resulting pressure to be delivered to the crank shaft as power, one piston operating to exert an upward pull upon one crank while the other piston operates to apply a downward force against the opposite crank, both pistons thereby tending to turn the crank shaft in the same direction, and also causing an equalizing of torque tending to reduce vibration.

Figure 2:
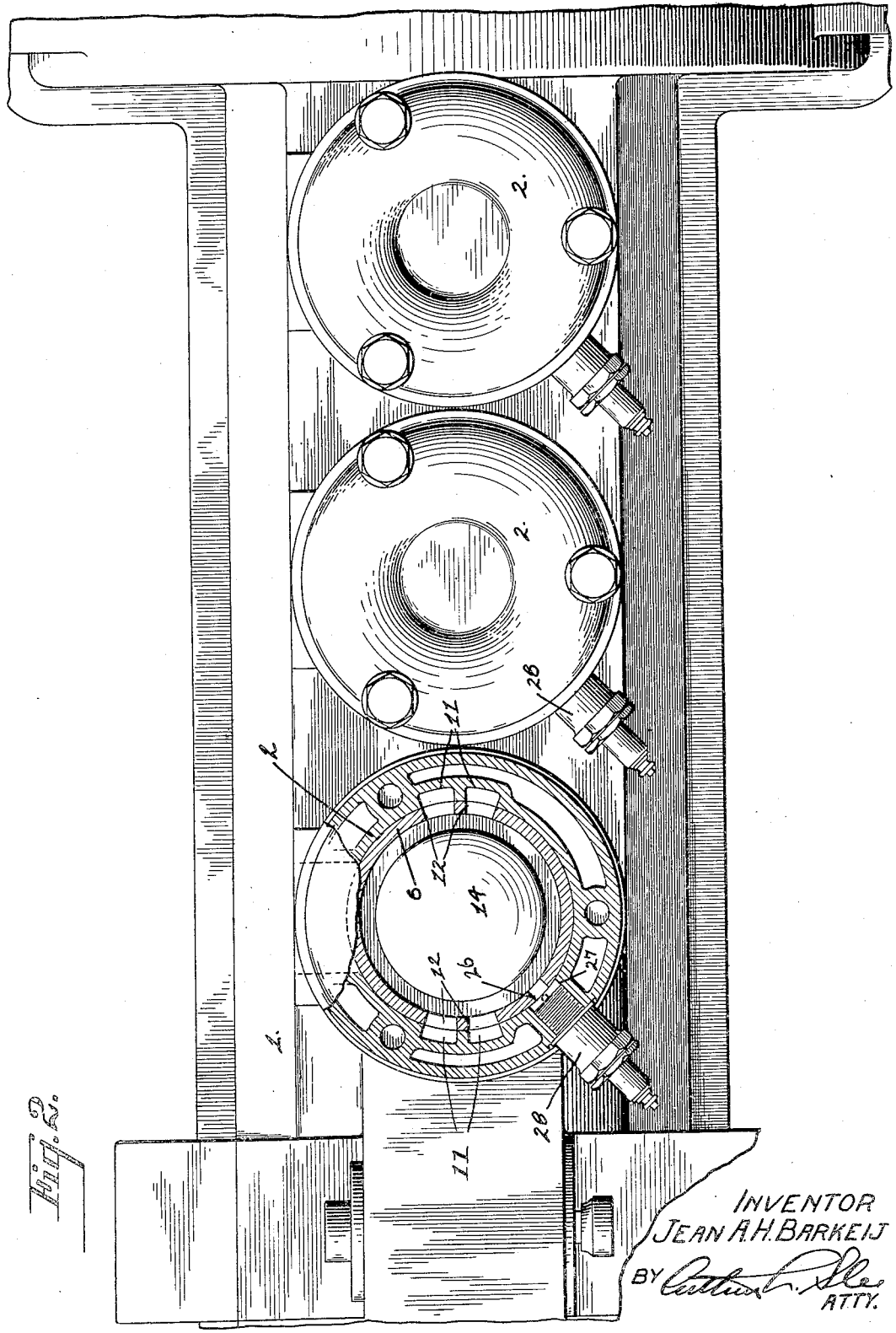
Fig. 2 is a broken plan view of the engine, one cylinder and piston being shown in horizontal secton.

In the preferred form of my invention disclosed in the drawings, I have disclosed an engine having three cylinders, as best shown in Figs. 1 and 2, the connecting rods of the pistons within each cylinder being arranged 180° apart as above described. The corresponding connecting rods of pistons within adjacent cylinders are arranged 120° apart with respect to each other. In this manner the two stroke cycle operation causes a continuous and substantially uniform application of power corresponding to the action of a six cylinder engine operated upon a four stroke cycle. From this it will be seen that I have provided an improved engine which is extremely light and compact but which will develop and deliver power equal to that of a much larger and heavier engine.

By my double piston arrangement and the ports above disclosed I avoid the use of valves and valve actuating mechanism, and the timing mechanism necessarily associated therewith. The elimination of these elements materially simplifies the construction and maintenance of the engine. By properly adjusting the size and position of the intake and exhaust ports I am able to greatly reduce the loss of fuel heretofore occurring in engines of the two cycle type. I provide relatively large exhaust ports upon opposite sides of the piston and cylinder so that a large area will be provided for the escape of the burnt gases. Intake ports 12 and transfer passages 11 are arranged upon opposite sides of the piston, and upon a diameter at right angles to that of exhaust ports 4 and intake ports 3. It will be seen that when ports 12 register with transfer passages 11, there will be a sudden inrush of gas under a high pressure which has been created above the piston during the firing stroke. This sudden and rapid inrush of fresh gas causes the burnt gases to be expelled before intermingling takes place. In this manner the amount the spent gas allowed to remain in The explosion chamber is reduced to a negligible amount, and at the same time no appreciable amount of the fresh charge is lost through the exhaust.

A feature of my construction comprises passages 29 whereby communcation is established between the crank case of the engine and the space below the head of the large piston. This provision prevents having a vacuum formed beneath the piston head and permits the air of the crank case, which is always more or less charged with the spray or vapor of the lubricants used in the crank case, to enter the space below the large piston head and assist in its lubrication of this piston.

The device as disclosed in the drawings and the above description is subject to wide variation in the matter of structural details and arrangement without departing from the spirit of my invention. I therefore do not desire to restrict myself to the particular construction and arrangement of parts disclosed but wish to avail myself of all modifications which may fall within the scope of the appended claims.

Having thus described my invention what I claim as new and desire to secure by Letters Patent is—

1. An internal combustion engine comprising; a cylinder having longitudinal slots in its wall adjacent its head adapted for transfer passages, intermediate intake ports, and exhaust ports below the intakes; a tubular piston within the cylinder having ports through its wall adjacent its head adapted to register with said slots, and ports through its wall adapted to coincidently register with said exhaust ports; the broader portion of said tubular piston having an extension which prevents communication between the inlet port and crank case and spark plug and crank case during any position of the crank shaft; a second piston within the tubular portion of the first; and means for firing an explosive mixture within the first piston above the second; said pistons being operatively connected to a common crank shaft for opposite reciprocation; and said ports and slots being arranged respectively in diametrically opposed pairs with the slots disposed in quadrature relation to the ports.

2. An internal combustion engine comprising; a differential cylinder having longitudinal slots in its wall adjacent its head adapted for transfer passages, intermediate intake ports in its large bore, and exhaust ports below the intakes in its small bore; a hollow differential piston within the cylinder having ports adjacent its head adapted to register with said slots, and ports in its trunk portion adapted to coincidently register with said exhaust ports; a second piston within said trunk portion; the broader portion of this differential piston having an extension which prevents communication between the inlet port in the cylinder wall and spark plug and crank case during any position of the crank shaft; and means for firing an explosive mixture within said trunk above the second piston; said pistons being operatively connected to a common crank shaft for opposite reciprocation; and said ports and slots being arranged respectively in diametrically opposed pairs with the slots disposed in quadrature relation to the ports.

3. An internal combustion engine as defined in claim 1, and add thereto passages between said crank case and the annular space below the broader portion of the upper piston to lead oil from or to said annular space to or from said crank case, in order to cool that part of the upper piston which is not in permanent contact with the water cooled cylinder wall.

4. A valveless internal combustion engine as described in claim 1, and add thereto said intermediate intake ports being so situated with relation to the ports in said tubular piston adjacent its head, that the latter ports are passing the level of said intermediate intake ports, when said tubular piston has approximately its maximum speed.

5. A valveless internal combustion engine as described in claim 2, and add thereto said intermediate intake ports being so situated with relation to the ports in said tubular piston adjacent its head, that the latter ports are passing the level of said intermediate intake ports, when said tubular piston has approximately its maximum speed.

In witness whereof I hereunto set my signature.

JEAN A. H. BARKEIJ.